UNITED STATES PATENT OFFICE.

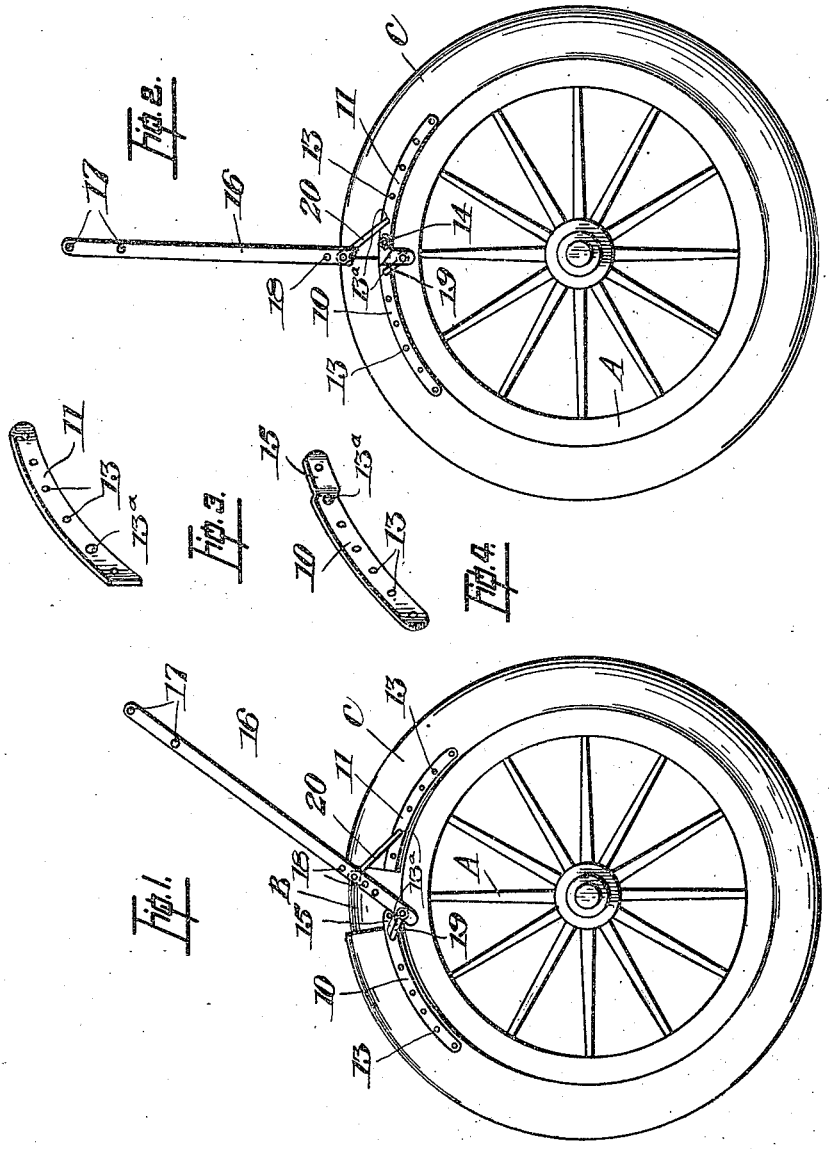

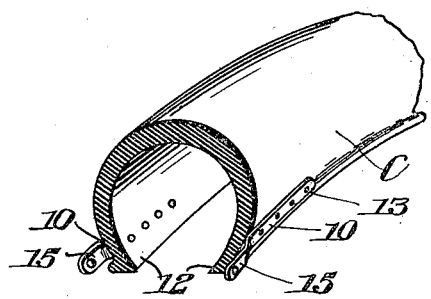
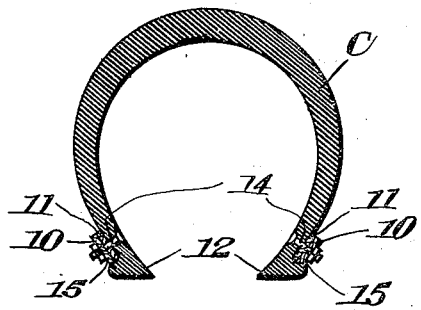
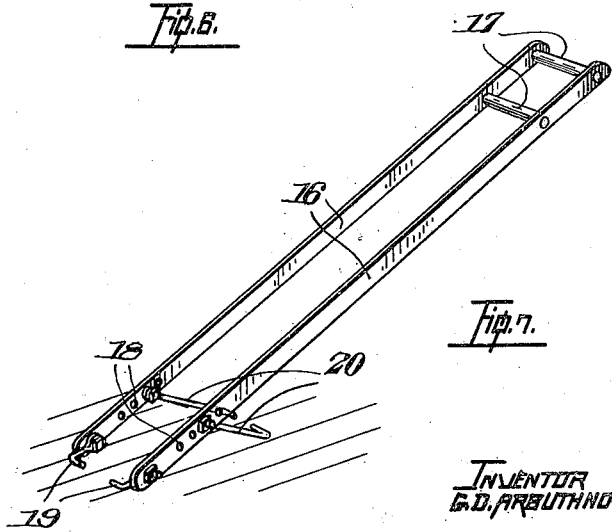

GEORGE DUNCAN ARBUTHNOT, OF NORTHFIELD STATION, ONTARIO, CANADA, ASSIGNOR TO JOHN WOOD, OF HARRISON'S CORNERS, ONTARIO, CANADA, AND (MRS.) TESSA McKAY, OF CORNWALL, ONTARIO, CANADA.

TIRE-PROTECTOR.

1,254,962. Specification of Letters Patent. Patented Jan. 29, 1918.

Application filed December 8, 1916. Serial No. 135,809.

*To all whom it may concern:*

Be it known that I, GEORGE DUNCAN ARBUTHNOT, a subject of the King of Great Britain, and resident of Northfield Station, in the Province of Ontario and Dominion of Canada, have invented certain new and useful Improvements in Tire-Protectors, of which the following is a full description.

This invention relates to improvements in tire protectors and the objects of the invention are to facilitate securing old worn out covers over new tires, thereby lengthening the life of the same, to permit of the abutting edges of the outer cover being readily connected together and generally to adapt the several parts to better perform the functions required of them.

With the above and other objects in view, the invention consists essentially of the improved construction particularly described and set forth in the following specification and accompanying drawings forming part of the same.

In the drawings,

Figure 1 is a side elevation of an automobile wheel showing the outer cover being positioned on the tire thereof.

Fig. 2 is a side elevation of an automobile wheel showing the outer cover secured in position over the tire thereof.

Fig. 3 is a perspective view of one of the securing cleats utilized on the outer covering.

Fig. 4 is a perspective view of a securing cleat designed to be mounted on the tire to co-act with the cleat shown in Fig. 3.

Fig. 5 is a perspective view showing one end of the outer cover with the cleats mounted thereon.

Fig. 6 is a transverse section through the cleats as seen when assembled.

Fig. 7 is a perspective view of the means adapted to position the outer cover.

Like characters of reference refer to like parts in the several figures.

Referring to the drawings, A represents an automobile wheel of any usual description provided with the tire B over which a partially worn out cover C is secured.

It will be readily understood that these outer covers when worn are at the present time discarded, but in the present invention the cover is cut through on one side as shown in Fig. 1 and cleats 10 and 11 secured to the edges thereof adjacent to the beading 12.

These cleats are provided with a plurality of orifices 13 and are secured in position by bolts, rivets or the like, the orifices in the adjacent ends of the said cleats being however adapted to be secured together by bolts 14 in a manner to be made clear hereafter.

The ends of the cleats 10 project beyond the edge of the cover C and are slightly offset as shown at 15, so that when the cover is pulled into position the said offset portion 15 will embrace the adjacent end of the cleat 11 and be secured thereto by the bolts 14.

In closing the cover C over the tire B, I employ a pair of levers 16, which are spaced apart at the upper ends by the hand grips 17, while the lower ends are provided with a plurality of orifices 18 to the lowermost of which the dogs 19 are pivotally secured. Dogs 20 are pivotally secured to the upper orifices 18 and when these levers are in use the dogs 19 are engaged with a pair of orifices 13ª in the cleats 10, while the dogs 20 are engaged with similar orifices in the cleats 11.

It will be readily seen that the dogs 19 and 20 are of unequal length with the latter capable of being adjusted with the orifices 18 to suit the length required so that, when a pull is applied to the levers 16 through the medium of the hand grips 17, the said levers are rotated in an anti-clockwise direction and the cover C is closed over the tire and the offset ends 15 of the cleats 10 embrace the adjacent ends of the cleats 11 whereupon they are secured in position by the bolts 14.

By utilizing two hand grips 17 the levers 16 are held spaced apart and are capable of being sprung over the cover C embracing the same therebetween so permitting of the dogs 19 being engaged with the cleats 10 and the dogs 20 with the cleats 11 on the opposite sides of the cover.

In removing the lever 16, it is only necessary to spring the same laterally apart releasing the dogs 19 and 20 from the cleats 10 and 11.

From this description it will be seen that

I have invented a tire protector which may be advantageously utilized on automobile wheels and will effect considerable saving of the tires thereof, the protector making a further use of the worn out covers, which at the present time are usually discarded, and when utilized in this manner will lengthen the life of the tires of the wheel.

As many changes could be made in the above construction and many apparently widely different embodiments of my invention within the scope of the claim constructed without departing from the spirit or scope thereof, it is intended that all matter contained in the accompanying specification and drawings shall be interpreted as illustrative and not in a limited sense.

What I claim as my invention is:

A device of the class and for the use described including a double lever, short inwardly bent arms on one end, longer inwardly bent arms adjustably pivoted on the lever, and hand grip spacing elements between the opposite ends of the lever.

In witness whereof I have hereunto set my hand in the presence of two witnesses.

GEORGE DUNCAN ARBUTHNOT.

Witnesses:
R. S. SMART,
ARTHUR MIDDLETON.

Copies of this patent may be obtained for five cents each, by addressing the "Commissioner of Patents, Washington, D. C."